United States Patent
Lutz

(10) Patent No.: US 6,843,020 B2
(45) Date of Patent: Jan. 18, 2005

(54) FERTILIZER SPIKE AND METHOD AND APPARATUS FOR INSERTING SAME INTO SOIL

(75) Inventor: LeRoy R. Lutz, Oregon, IL (US)

(73) Assignee: Lutz Corporation, Oregon, IL (US)

( * ) Notice: Subject to any disclaimer, the term of this patent is extended or adjusted under 35 U.S.C. 154(b) by 2 days.

(21) Appl. No.: 10/306,543

(22) Filed: Nov. 27, 2002

(65) Prior Publication Data

US 2004/0098910 A1 May 27, 2004

(51) Int. Cl.[7] .......................... A01G 29/00; A01C 5/02
(52) U.S. Cl. ..................... 47/48.5; 47/57.5; 111/92; 111/94
(58) Field of Search ............... 111/92, 94, 25, 111/1, 98, 99, 96, 4, 7.2, 114; 221/268, 272; 71/33, 54, 58, 32; 175/19, 21, 202, 162, 203, 220, 424; 294/49–52, 55.5; 411/451.1; 47/48.5, 1.5, 1.7, 57.5, DIG. 10; D8/1; A01C 19/00; A01G 29/00

(56) References Cited

U.S. PATENT DOCUMENTS

| | | | |
|---|---|---|---|
| 1,948,117 A | * | 2/1934 | Kadow |
| 2,030,770 A | | 2/1936 | Smith |
| 2,067,589 A | * | 1/1937 | Antrim |
| 2,380,721 A | | 7/1945 | Brigden |
| 2,857,864 A | | 10/1958 | Cromer |
| 3,232,007 A | | 2/1966 | Boatwright |
| 3,290,821 A | | 12/1966 | Parry |
| 3,903,815 A | | 9/1975 | Winkler |
| D243,614 S | * | 3/1977 | Russo .................. D25/77 |
| 4,031,832 A | * | 6/1977 | Edwards .................. 111/4 |
| 4,191,116 A | | 3/1980 | Allison, Jr. et al. |
| 4,246,854 A | * | 1/1981 | Lempa .................. 111/96 |
| 4,676,538 A | * | 6/1987 | Fiedler .................. 294/50 |
| 4,870,781 A | * | 10/1989 | Jones .................. 47/43 |
| 5,105,578 A | | 4/1992 | Fleuridas et al. |
| 5,461,992 A | * | 10/1995 | Scollard .................. 111/7.2 |
| 5,487,236 A | | 1/1996 | Moon |
| D389,705 S | | 1/1998 | Puett |
| D415,018 S | * | 10/1999 | Uhler .................. D8/840 |
| 6,076,300 A | | 6/2000 | Cronin |
| D438,435 S | * | 3/2001 | Whyte .................. D8/1 |

FOREIGN PATENT DOCUMENTS

| | | | | |
|---|---|---|---|---|
| DE | 3638039 A | * | 11/1986 | .......... C05F/11/00 |
| JP | 406217621 A | * | 8/1994 | .......... A01C/21/00 |

* cited by examiner

Primary Examiner—Peter M. Poon
Assistant Examiner—Andrea M. Valenti
(74) Attorney, Agent, or Firm—Leydig, Voit & Mayer, Ltd.

(57) ABSTRACT

A fertilizer spike is insertable into soil utilizing a tool having prongs. The fertilizer spike comprises a fertilizer body comprised of fertilizer material having a base end with an outer surface that converges toward a tip end, in which at least two channels are formed into the fertilizer body, for receiving the prongs of the tool. The fertilizer spike is also provided with a soil abutment surface that is adapted to hold the fertilizer spike in the soil when the tool is pulled away from the fertilizer spike. The prongs release the fertilizer spike as the tool is withdrawn.

26 Claims, 5 Drawing Sheets

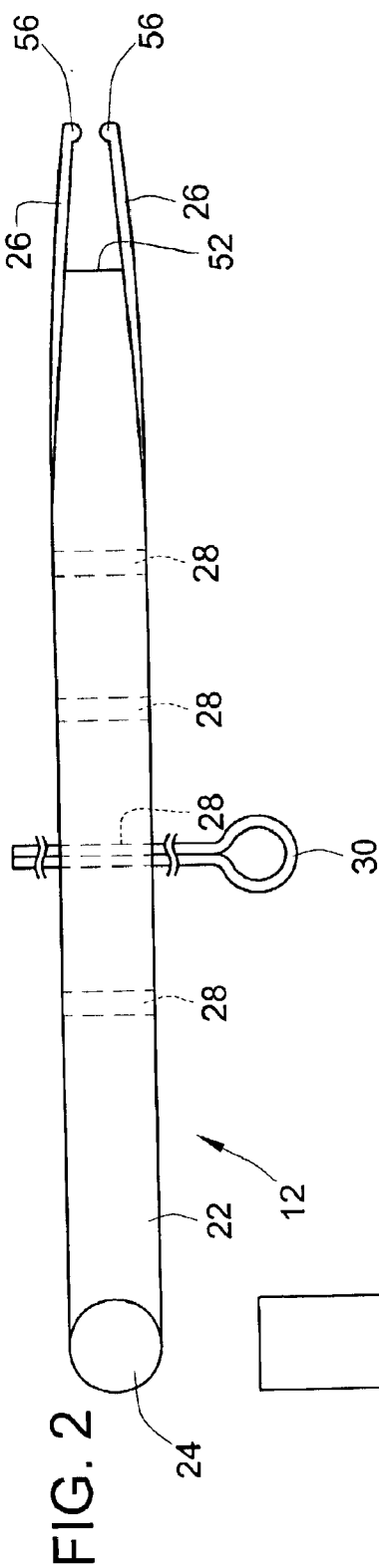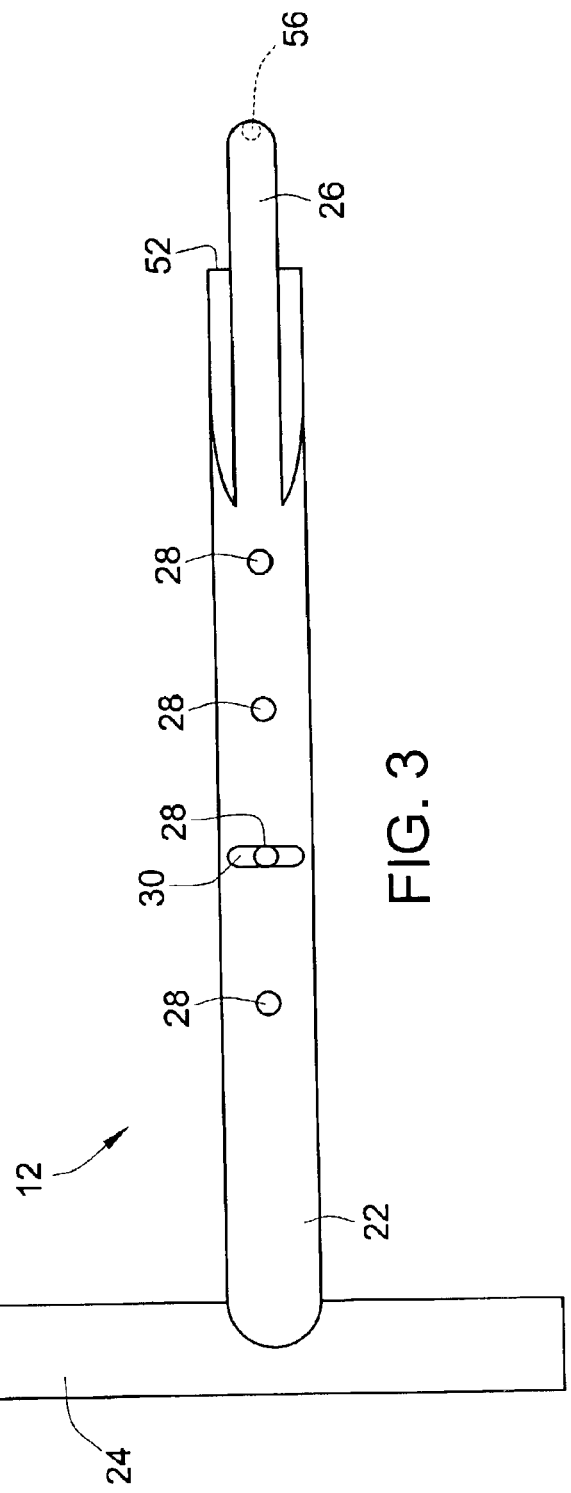

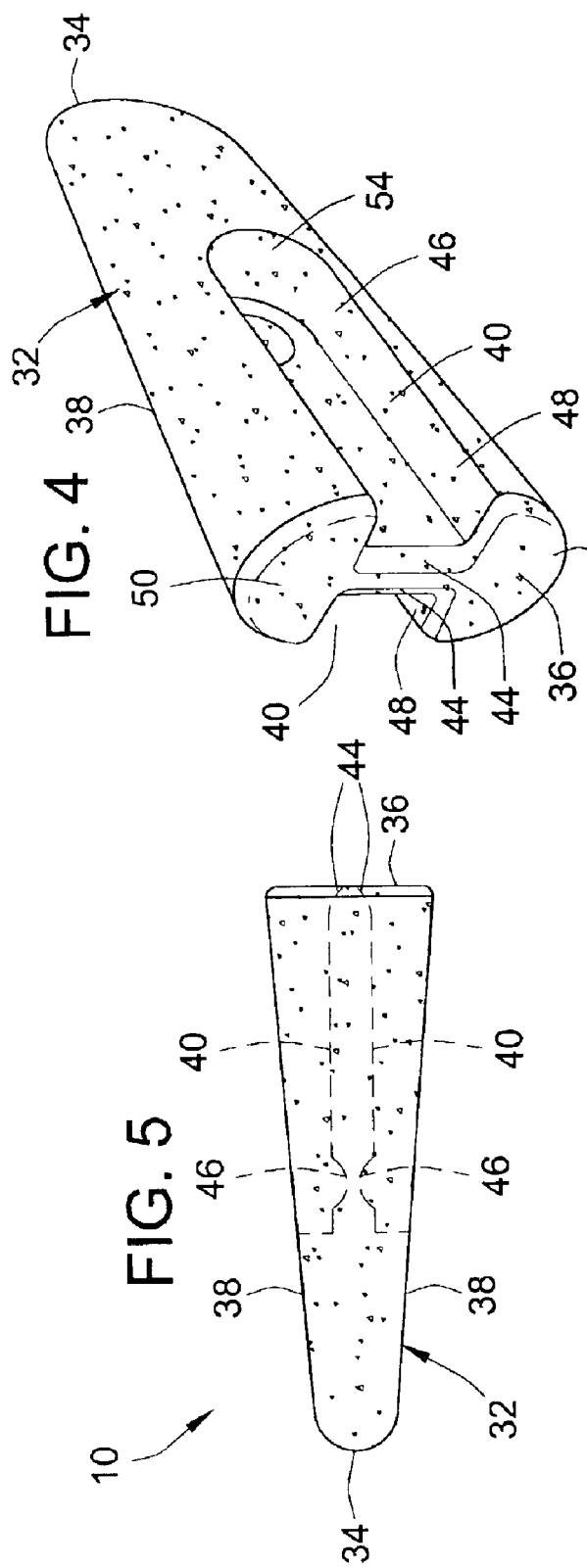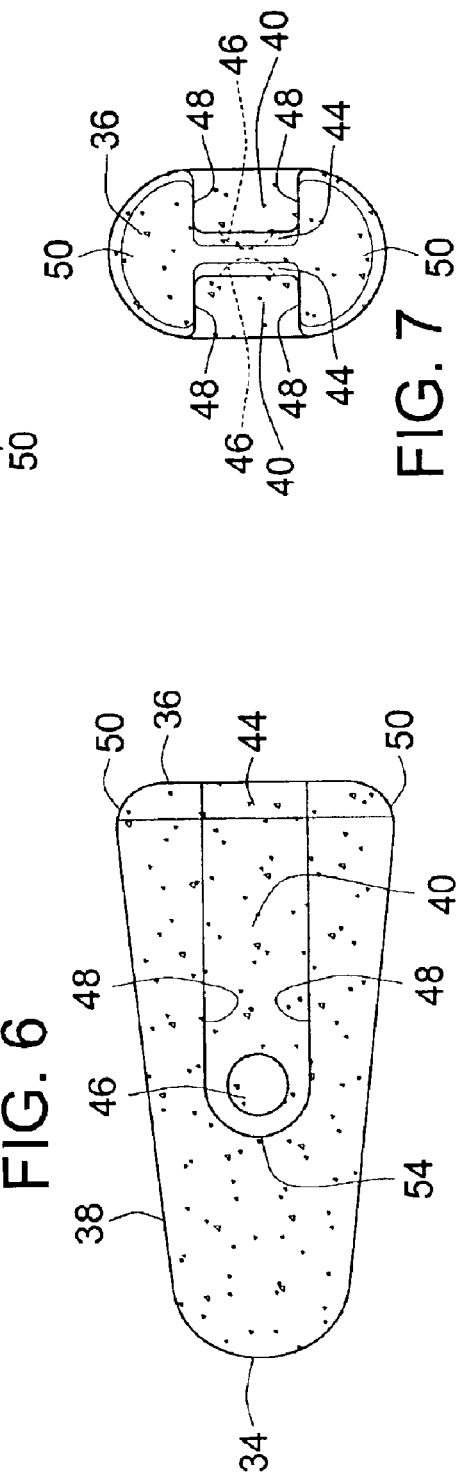

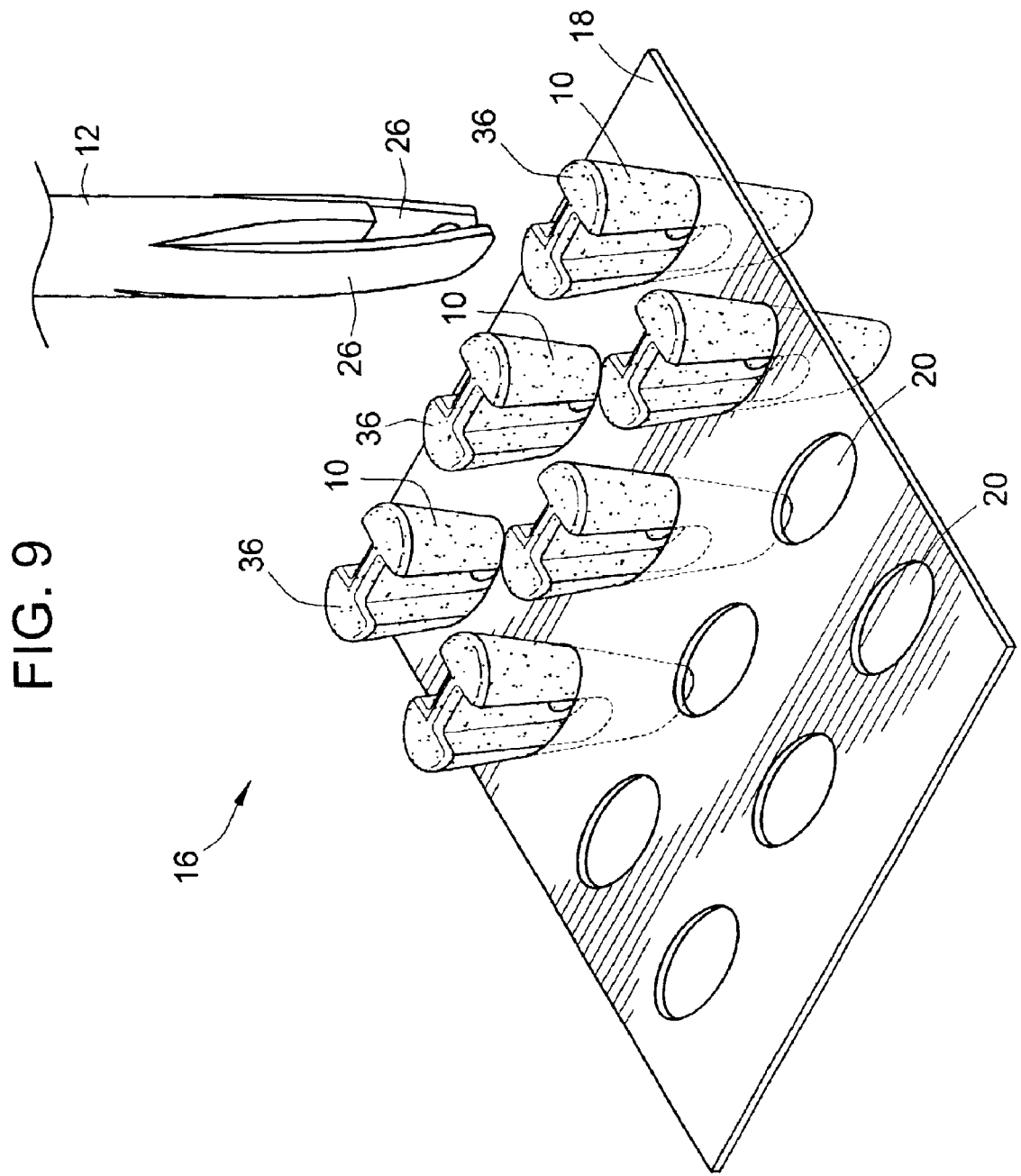

FERTILIZER SPIKE AND METHOD AND APPARATUS FOR INSERTING SAME INTO SOIL

FIELD OF THE INVENTION

This invention pertains to fertilizer spikes and methods and apparatus for inserting the same into a soil surface.

BACKGROUND OF THE INVENTION

Getting the right amount of fertilizer to potted plants is not an exact science. On a commercial level, such as for commercial greenhouses, fertilizing potted plants is often a timely and tedious task. Adding soluble fertilizer to water and then watering the plants is an imprecise science in that over-watering or under-watering can result in improperly fertilizer allocation. Further, fertilizing by means of water needs to reoccur at short time intervals because the fertilizer is already completely dissolved in the water when it is applied such that it is fast release method rather than a slow release method. Spreading fertilizer on top of the soil is not a desirable solution as measuring precise fertilizer amounts is difficult and imprecise allocation is still a problem. Further, over-watering can sometimes wash away granular fertilizer material.

While fertilizer spikes and spike insertion tools are known, such as those disclosed for example in U.S. Pat. Nos. 3,903,815, 3,232,007, 2,380,721, and 3,290,821, prior methods and apparatus for installing fertilizer spikes into the soil have typically been too complicated, time consuming, and/or cost prohibitive.

BRIEF SUMMARY OF THE INVENTION

It is a general aim of the present invention to overcome the problems existing in the art.

One aspect of the present invention is directed toward a novel fertilizer spike that can be inserted into soil utilizing a tool with prongs. The fertilizer spike includes a body comprised of fertilizer material. The fertilizer body has a base end with an outer surface that converges toward a tip end, in which at least two channels are formed into the fertilizer body, for receiving the prongs of the tool. The fertilizer spike is also provided with a soil abutment surface that is adapted to hold the fertilizer spike in the soil when the tool is pulled away from the fertilizer spike.

Another aspect of the present invention relates to the functional and/or operational aspects of a fertilizer pellet. According to this aspect, the fertilizer pellet includes fertilizer body comprised of fertilizer material having a tip end and a base end. The fertilizer pellet further includes means for releasably attaching the fertilizer body to the tool; and soil engagement means for engaging the soil when the fertilizer pellet is inserted to provide sufficient counteracting force to overcome said attaching means to release the fertilizer body from the tool.

Another aspect of the present invention relates to a new fertilizer kit comprising a fertilizer spike insertion tool and a plurality of fertilizer spikes. The fertilizer spike insertion tool comprises resilient prongs that releasably grasp the fertilizer spikes. The fertilizer spike includes a soil abutment surface that engages the soil to facilitate actuation of the prongs for release of the fertilizer spike.

A further aspect of the present invention is directed toward a novel method for inserting a fertilizer spike into the soil utilizing a tool. The method includes gripping the fertilizer spike with the tool. The gripped fertilizer spike is pushed into the soil with the tool along a first direction. The tool is pulled away from the fertilizer spike along a second direction generally opposing said first direction. The fertilizer spike is held in the soil while the tool is pulled with a force provided by engagement between the fertilizer spike and the soil. This holding force is utilized to actuate the tool to release the tool from the fertilizer spike as the tool is pulled away.

BRIEF DESCRIPTION OF THE DRAWINGS

FIGS. 2 and 3 are side and end views of the fertilizer spike insertion tool shown in FIG. 1.

FIGS. 4–7 are isometric, end, side and top views of the fertilizer spike shown in FIG. 1.

FIG. 9 is a perspective illustration of a kit including a tray of fertilizer spikes to provide for ready use with a fertilizer spike insertion tool.

DETAILED DESCRIPTION OF THE INVENTION

Figure 1:
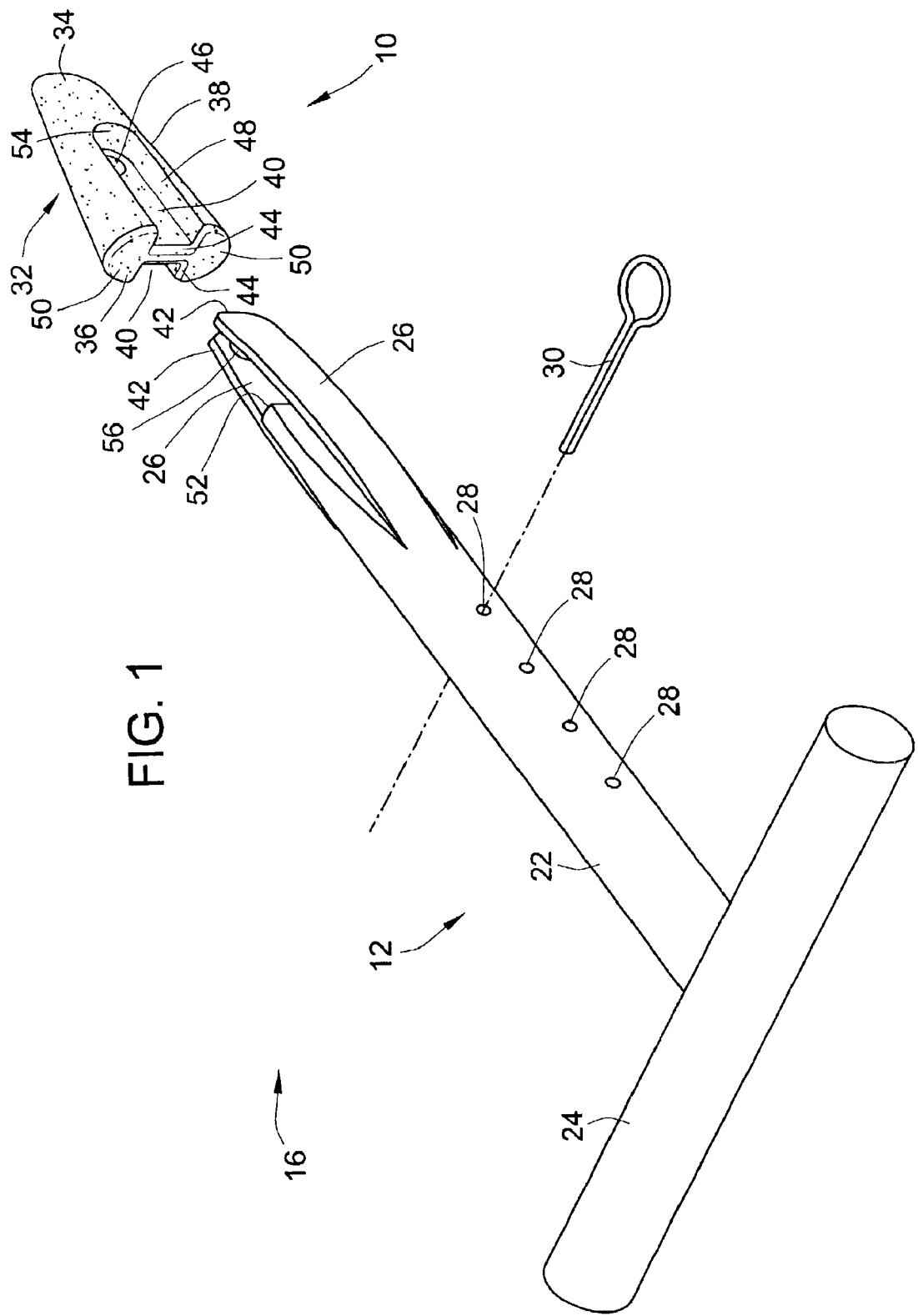
FIG. 1 is a perspective illustration of a fertilizer spike according to a preferred embodiment of the present invention and a novel fertilizer spike insertion tool for use therewith.
Figure 8:
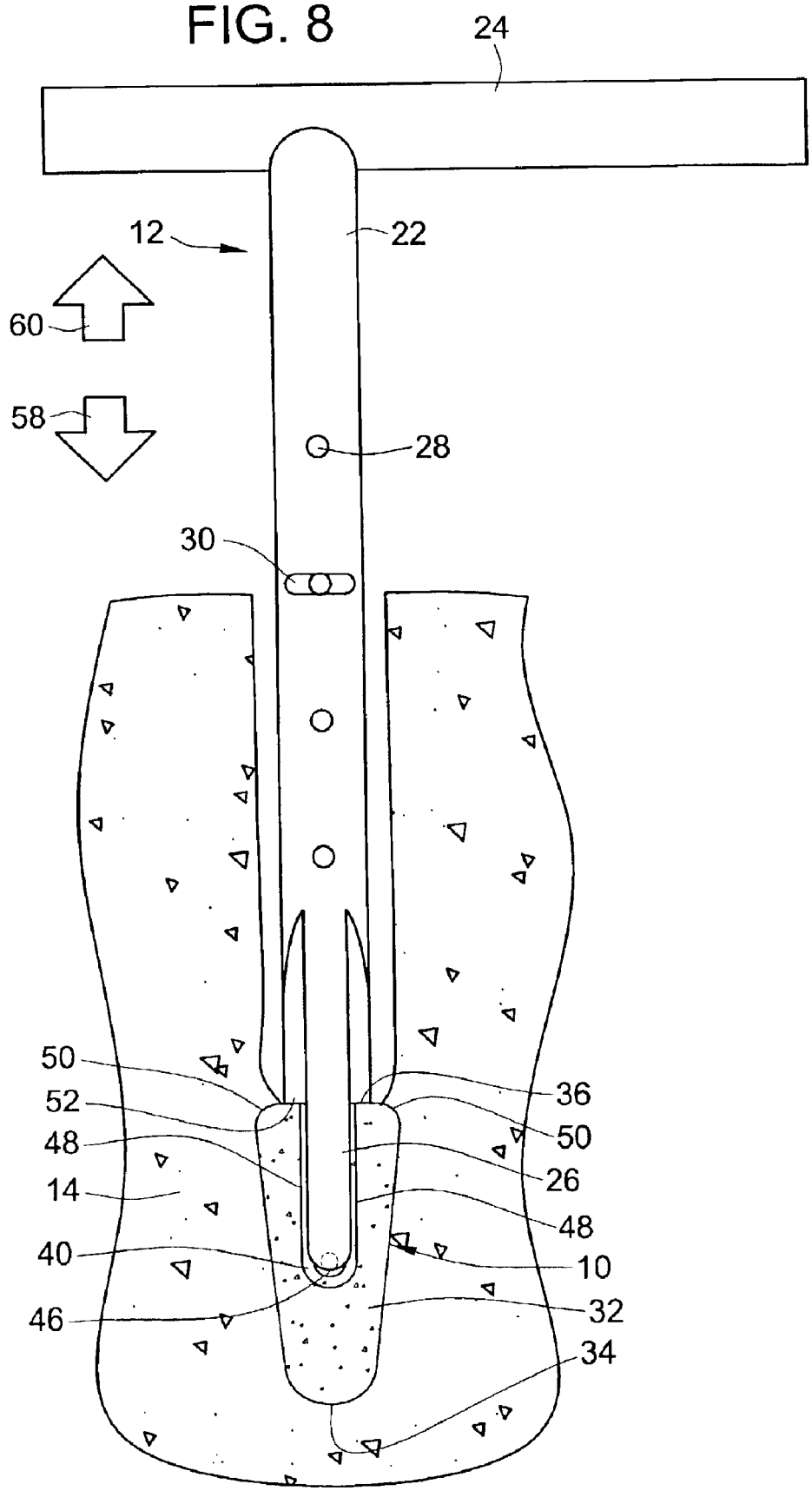
FIG. 8 is an operational cross sectional illustration of the fertilizer spike being inserted into soil by the fertilizer spike insertion tool.

FIG. 1 illustrates a fertilizer pellet or spike 10 in accordance with an embodiment of the present invention and a fertilizer spike insertion tool 12 that may be used to insert the fertilizer into soil 14 as shown in FIG. 8. The combination of multiple fertilizer spikes 10 and the tool 12 make up a kit 16 as shown in FIG. 9. The kit 16 includes an egg carton-like tray 18 with individual holding pockets 20 that hold the fertilizer spikes 10 upright for ready grasping with the insertion tool 12.

The disclosed embodiment is particularly suited for use with loose soil 14 such that manual force provided with ordinary arm strength is all that is needed to insert fertilizer spikes 10 to the desired depth. As such, the disclosed embodiment present invention is particularly advantageous in greenhouses and/or for indoor potted plants in which loose soil is ordinarily provided. It may also be used in outdoor applications for sandy or otherwise loose soils, or after the soil has been irrigated or loosened such as by rototilling.

Referring to FIGS. 1–3, the tool 12 may be made of wood, plastic, metal or a combination of these materials. The tool 12 includes a shaft 22 with a handle 24 at one end and at least two grasping prongs 26 at the other end. The handle 24 extends generally perpendicular to the shaft to provide a gripping surface that can be readily manipulated to drive the tool 12 forwardly and pull the tool 12 rearwardly. The tool 12 may be unitarily formed as a single component or assembled from different components. The prongs 26 are resilient and are able to flex inwardly and outwardly relative to each other.

The tool 12 may also include measuring means such as depth markings or a movable depth element that is movable relative to the shaft 22 such as a plurality of holes 28 in the shaft 22 and a pin 30 that can be selectively fitted in the holes 28. The measuring means provides a visual indication to the user that the proper spike depth has been reached and therefore the tool can be withdrawn.

Referring to FIGS. 1 and 4–7, the fertilizer spike 10 includes a fertilizer body 32 comprised of fertilizer material (e.g. nitrogen, phosphorus, potash, and/or other plant food components) that has been formed, conglomerated, agglomerated or otherwise bound together. The fertilizer body 32 generally includes a rounded tip end 34 and a base end 36. The fertilizer body includes an outer tapered surface 38 that converges from the base end 36 to the tip end 34. The tapering of the surface 38 provides the fertilizer spike 10 with a wedge shape that allows for easy insertion into the soil.

The fertilizer spike 10 may also include at least two channels 40 that facilitate attachment of the fertilizer spike 10 to the prongs 26 of the tool 12. The channels 40 are spaced and sized to receive the prongs 26 of the tool 12. Although the channels 40 are shown as open, it will also be appreciated that the channels may be enclosed with fertilizer material surrounding the channels 40 to provide for larger fertilizer spikes. Also, a further attachment means alternative may be to provide one channel to receive one resilient prong if the tool provided a counter-abutment support surface acting against the one resilient prong. Yet a further less preferred attachment means alternative would be to provide an outer surface of the fertilizer spike with a width closely dimensioned but just larger than the spacing of prongs 26 or other such tool clamping or grasping mechanisms to cause one or more prongs to spread and thereby provide a clamping force that temporarily holds the fertilizer spike for soil insertion.

In the disclosed embodiment, the channels 40 extend through the base end 36 which provides the advantage that it is easy to orient and guide the prongs 26 into the channels 40 when picking the spike. The channels 40 may also be spaced just wider than the tips 42 of the prongs 26 such that the bottoms of channels 40 spread the resilient prongs 26 outwardly. To allow for ready insertion of the prongs 26 into the channels 40, inwardly tapered cam surfaces 44 are provided at the base end 36 that engage the prong tips 42 to spread the prongs 26 outwardly.

The clamping force provided against the bottoms of the channels 40 by the prongs that provide a holding force to allow for grasping and manipulation of the fertilizer spike 10 with the tool 12 in order to orient the spike for insertion into the soil. More preferably, inward cavities or dimples 46 are provided in the channel bottoms that receive the prong tips 42 and thereby provide for an increased holding force on the fertilizer spike 10. The dimples 46 are curved or angled to provide a camming means to drive the prongs 26 outward after spike insertion and when the tool 12 is being withdrawn to release the spike 10 from the tool 12. Likewise, inner sides of the prongs may include semispherical knobs 56 that are received into the dimples 46.

The channels 40 also provide sidewalls 48 that are spaced at a width comfortably greater than the width of the prongs 26. The channel sidewalls 48 provide a side support surface such that engagement between the prongs 26 and the channel sidewalls 48 prevent rotation or buckling of fertilizer spike 10 when the spike 10 is being pushed into the soil surface.

A further aspect of the present invention is the provision of a soil abutment surface 50 that engages the soil to hold the fertilizer spike 10 in the soil 14 after spike insertion, as the tool is being pulled away or withdrawn. In the disclosed embodiment, the soil abutment surface 50 is provided at the base end 36, although it can be provided along the outer tapered surface 38 of the fertilizer spike 10. A large soil abutment surface 50 is facilitated by virtue of the fact that the base end 26 is wider than the opposing support face 52 provided at the end of the tool shaft 22. The soil abutment surface 50 sticks radially outward from the tool 12 when the fertilizer spike 10 is attached to the tool 12. The base end 26 engages the support face 52 of the tool 12 for support when the fertilizer spike 10 is being inserted into the soil. The front ends 54 of the channels 40 may also engage the prongs 26 of the tool for support of the pushing action during spike insertion.

In operation, multiple fertilizer spikes 10 are arranged and supported in the tray 18 with base ends 36 faced upright for ready pick up by the tool 12. With the orientation and support provided by holding pockets 20 in the tray, individual fertilizer spikes 10 can then be picked up by the tool 12 without manual handling or manipulation. To grip a spike 10, the prongs 26 are inserted and slid into corresponding channels 40 of the fertilizer spike. The prongs 26 initially flex outwardly as the prong tips 42 engage the cam surfaces 44 at the base end and then inwardly as the knobs 56 progress into the dimples 46. Referring to FIG. 8, the fertilizer spike 10 is then pushed by the tool 12 into the soil 14 along a first direction 58. As the spike 10 is being pushed, the channel sidewalls 48 provide side support and engage the prongs 26 to prevent the fertilizer spike 10 from buckling. The measuring pin 30 may be used to indicate when proper spike depth has been reached. Once the spike 10 is inserted into the soil 14, the tool 12 is withdrawn by pulling the tool 12 away from the fertilizer spike 10 along a second direction 60. Once submerged in the soil 14, the fertilizer spike 10 is held in position with a force provided by engagement between the fertilizer spike and the soil along the abutment surface 50. The abutment surface 50 provides a sufficient counteracting force to overcome the gripping power of the prong 26 and thereby flex the prongs 26 outward such that the prongs 26 slide in the channels 40 to release the tool 12 from the fertilizer spike 10 as the tool is pulled away.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fertilizer spike for insertion into soil utilizing a tool having prongs, comprising:
    a fertilizer body comprising fertilizer material having a tip end and a base end, the body having an outer surface that converges from the base end to the tip end;
    at least two channels formed into the fertilizer material of the fertilizer body, the at least two channels adapted to receive the prongs of the tool such that when the tool is applied to the fertilizer body the channels receive the prongs; and
    a soil abutment surface adapted to hold the fertilizer spike in the soil when the tool is pulled away from the fertilizer spike; and wherein the at least two channels include cavity means for retaining the fertilizer body to the tool.

2. The fertilizer spike of claim 1 wherein the abutment surface is provided along the base end, the base end being wider than an opposing face of the tool when attached thereto to provide the abutment surface.

3. The fertilizer spike of claim 1 wherein the channels extend through the base end, the channels defining sidewalls for engaging the prongs to prevent buckling during insertion of the fertilizer spike.

4. The fertilizer spike of claim 1 wherein said at least two channels comprises only two channels.

5. A fertilizer spike for insertion into soil utilizing a tool having prongs, comprising:
    a fertilizer body comprising fertilizer material having a tip end and a base end, the body having an outer surface that converges from the base end to the tip end;
    at least two channels formed into the fertilizer body, the at least two channels adapted to receive the prongs of the tool;
    a soil abutment surface adapted to hold the fertilizer spike in the soil when the tool is pulled away from the fertilizer spike;
    wherein the at least two channels include cavity means for retaining the fertilizer body to the tool; and
    wherein said cavity means further comprises a camming means for releasing the tool from the fertilizer spike when the tool is pulled away from the fertilizer spike.

6. A fertilizer spike for insertion into soil utilizing a tool having prongs, comprising:
    a fertilizer body comprising fertilizer material having a tip end and a base end, the body having an outer surface that converges from the base end to the tip end;
    at least two channels formed into the fertilizer body, the at least two channels adapted to receive the prongs of the tool;
    a soil abutment surface adapted to hold the fertilizer spike in the soil when the tool is pulled away from the fertilizer spike;
    wherein the channels extend through the base end, the channels defining sidewalls for engaging the prongs to prevent buckling during insertion of the fertilizer spike; and
    camming means in the channel at the base end for guiding the prongs into the channels.

7. A fertilizer pellet for insertion into soil utilizing a tool, comprising:
    a fertilizer body comprising of fertilizer material having a tip end and a base end;
    means formed into the fertilizer material of the fertilizer body for releasably attaching the fertilizer body to the tool; and
    soil engagement means for engaging the soil when the fertilizer spike is inserted to provide sufficient counteracting force to overcome said attaching means to release the fertilizer body from the tool.

8. The fertilizer pellet of claim 7 wherein said attaching means comprises at least two channels formed into the fertilizer body, the at least two channels adapted to receive the flexible prongs of the tool.

9. The fertilizer pellet of claim 7 further comprising means for preventing buckling of the fertilizer pellet when the fertilizer pellet is inserted into soil.

10. The fertilizer pellet of claim 7 wherein said attaching means comprises a cavity for retaining the fertilizer body to the tool.

11. The fertilizer pellet of claim 7 wherein said soil engagement means comprises an abutment surface provided along the base end, the base end being wider than an opposing face of the tool when attached thereto to provide the abutment surface.

12. The fertilizer pellet of claim 7 wherein said attaching means comprises at least one channel adapted to receive at least one resilient prong of the tool.

13. A fertilizer pellet for insertion into soil utilizing a tool having flexible prongs, comprising:
    a fertilizer body comprising fertilizer material having a tip end and a base end; and
    means for releasably attaching the fertilizer body to the tool;
    soil engagement means for engaging the soil when the fertilizer spike is inserted to provide sufficient counteracting force to overcome said attaching means to release the fertilizer body from the tool;
    wherein said attaching means comprises at least two channels formed into the fertilizer body, the at least two channels adapted to receive the flexible prongs of the tool; and
    camming means in the channel at the base end for guiding the prongs into the channels.

14. A fertilizer pellet for insertion into soil utilizing a tool, comprising:
    a fertilizer body comprising of fertilizer material having a tip end and a base end;
    cavity means formed into the fertilizer material of the fertilizer body for releasably retaining the fertilizer body to the tool;
    soil engagement means for engaging the soil when the fertilizer spike is inserted to provide sufficient counteracting force to overcome said attaching means to release the fertilizer body from the tool; and
    wherein said cavity means further comprises a camming means for releasing the tool from the fertilizer spike when the tool is pulled away from the fertilizer spike.

15. A fertilizer kit, comprising:

a plurality of fertilizer spikes, each fertilizer spike comprising a fertilizer body comprising fertilizer material, each fertilizer body comprising at least two channels formed into the fertilizer material extending toward the tip end and an abutment surface adapted to engage the soil;

a spike insertion tool having at least two resilient prongs slidable into the at least two channels and gripping the spike when inserted into the at least two channels to attach a fertilizer spike to the spike insertion tool, the resilient prongs flexing when the spike insertion tool is pulled away from an attached fertilizer spike to release the attached fertilizer spike from the insertion tool.

16. The fertilizer kit of claim 15 wherein the at least two channels include dimpled cavities, the spike insertion tool including inwardly projecting knobs fitting into the dimpled cavities to retain the fertilizer body to the spike insertion tool.

17. The fertilizer kit of claim 16 wherein said dimpled cavities further comprise a cam surface adapted to engage the knobs to urge the prongs outward as the spike insertion tool is pulled away from the fertilizer spike.

18. The fertilizer kit of claim 15 wherein the channels extend through the base end, the channels further comprising means for preventing buckling of the fertilizer spike during insertion into soil with the tool.

19. The fertilizer kit of claim 18 further comprising camming means in the channel at the base end for spreading the prongs outwardly to be received into the channels.

20. The fertilizer kit of claim 15, wherein the spike insertion tool includes a shaft with a handle at one end and the resilient prongs at the other end.

21. The fertilizer kit of claim 20, wherein the shaft includes a face opposite said base end, the base end being wider than the face to provide for said abutment surface.

22. The fertilizer kit of claim 20, wherein the shaft provides means for measuring the depth for which fertilizer spikes are inserted into a soil surface.

23. The fertilizer kit of claim 22, wherein said measuring means includes a plurality of holes and a indicating pin, the indicating pin fitting into each of the holes.

24. The fertilizer kit of claim 15, wherein the plurality of fertilizer spikes are contained in a tray with the base ends projecting upwardly in an orientation for engagement with the tool.

25. A method for inserting fertilizer spikes into the soil utilizing a tool having flexible prongs, comprising:

gripping the fertilizer spike with the tool by pushing the tool against the fertilizer spike which in turn causes the flexible prongs to cam and deflect into gripping engagement with the fertilizer spike; wherein said gripping comprises inserting prongs of the tool into corresponding channels formed into the fertilizer spike;

pushing the fertilizer spike into the soil with the tool along a first direction;

pulling the tool away from the fertilizer spike along a second direction generally opposing said first direction;

holding the fertilizer spike in the soil during said pulling with a force provided by engagement between the fertilizer spike and the soil; and utilizing said force to actuate the tool to release the gripping engagement of the tool from the fertilizer spike as the tool is pulled.

26. The method of claim 25 further comprising measuring depth for which the fertilizer spike is pushed into the soil.

* * * * *